United States Patent
Sipma et al.

(10) Patent No.: US 6,539,845 B2
(45) Date of Patent: Apr. 1, 2003

(54) APPARATUS FOR CUTTING AND STIRRING CURD

(75) Inventors: Sijmen Sipma, De Knipe (NL); Sjoerd Huitema, Koudum (NL)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/109,926

(22) Filed: Mar. 29, 2002

(65) Prior Publication Data

US 2002/0096057 A1 Jul. 25, 2002

Related U.S. Application Data

(62) Division of application No. 09/842,605, filed on Apr. 25, 2001, now Pat. No. 6,418,836.

(30) Foreign Application Priority Data

Apr. 25, 2000 (NL) .............................................. 1015016

(51) Int. Cl.⁷ ............................. A01J 25/00; A01J 25/06
(52) U.S. Cl. ............................. 99/466; 99/452; 99/460; 99/461
(58) Field of Search ........................... 99/452, 460–466, 99/453, 456; 426/36, 582, 581, 583; 241/101.1, 98, 282.1; 366/147, 149, 300, 301, 307, 312, 319, 328.2, 155.2, 156.1, 156.2, 325.1, 325.2, 325.3, 329.1, 325.8

(56) References Cited

U.S. PATENT DOCUMENTS

| 2,029,691 A | * | 2/1936 | Robinson ................... 99/462 X |
| 3,829,594 A | * | 8/1974 | Schweizer ................... 99/460 |
| 3,858,855 A | * | 1/1975 | Hazen ....................... 99/462 X |
| 4,108,058 A | * | 8/1978 | Sjoholm et al. .............. 99/466 |
| 4,206,880 A | * | 6/1980 | Stanton ....................... 99/462 |
| 4,612,853 A | * | 9/1986 | Hauck ....................... 99/460 X |
| 4,989,504 A |   | 2/1991 | Jay |

FOREIGN PATENT DOCUMENTS

| FR | 1277015 | 12/1960 |
| GB | 1025893 | 1/1963 |
| NL | 69773 | 2/1950 |
| NZ | 307820 | 12/1998 |

* cited by examiner

*Primary Examiner*—Timothy F. Simone
(74) *Attorney, Agent, or Firm*—Fulbright & Jaworski L.L.P.

(57) ABSTRACT

Apparatus for cutting and stirring curd, comprising a curd vat with a shaft drivable for rotation, which shaft comprises a number of cutting frames extending radially from the shaft and having a number of strip-shaped transverse knives and longitudinal knives, the longitudinal knives each having an inner end situated near the shaft and an outer end situated near the wall of the curd vat, while at least a number of longitudinal knives of at least one of the cutting frames are provided, at the outer end situated near the wall of the curd vat, with a knife end section which has at least one portion extending transversely to the longitudinal direction of the longitudinal knives.

7 Claims, 4 Drawing Sheets

APPARATUS FOR CUTTING AND STIRRING CURD

CROSS REFERENCE TO RELATED APPLICATIONS

This is a divisional application of U.S. Ser. No. 09/842,605 filed Apr. 25, 2001, now U.S. Pat. No. 6,418,836.

BACKGROUND OF THE INVENTION

This invention relates to an apparatus for cutting and stirring curd. Such apparatuses are known from practice and comprise a tank in which a rotatable shaft is situated which carries cutting frames extending radially from the shaft, which cutting frames are mounted on the shaft in staggered relation. The cutting frames each comprise two spaced-apart parallel frame girders, which are mounted by one end on the rotatable shaft and whose other end extends to a point near the wall of the tank. The tank can be disposed horizontally or vertically, the rotatable shaft then being likewise horizontal or vertical.

Arranged between the frame girders is a lattice of longitudinal and transverse knives. The transverse knives extend transversely to the frame girders and are welded to them. The longitudinal knives extend parallel to the frame girders and are mounted on the transverse knives by welding.

Such an apparatus is, for instance, the curd vat marketed by Tetra Pak Tebel under the name of OST4. Such an apparatus is also described, for instance, in U.S. Pat. No. 4,108,058. A variant with two horizontal shafts in a horizontal oval tank is described in U.S. Pat. No. 4,989,504.

All known apparatuses are arranged for stirring and cutting curd which has formed in the tank in that the tank has been filled with milk to which starter and rennet have been added. To that end, the central shaft is driven for rotation, so that the cutting frames move through the curd formed. The cutting frames are usually designed such that the knives and the frame girders form a cutting edge along one edge and are blunt and rounded off along the other edge. Accordingly, rotation of the central shafts) in one direction substantially yields a cutting action, while rotation in the other direction substantially yields a stirring action.

A problem occurring in the known apparatuses is that on the wall of the tank plaques of curd may form, which are not carried along by the knives of the cutting frames. Such plaques often come off the wall in a later stage, for instance during stirring, subsequent to cutting. If the plaques come off in such a late stage, comminution of the plaques takes place too late, which has an adverse effect on the homogeneity of the cheese to be produced, since the point of cutting the curd is to promote moisture egress. In the event of plaques or chunks undergoing a cutting operation later than the rest of the curd, moisture egress sustains a delay, which has a direct influence of the homogeneity of the cheese to be produced.

The object of the invention is to obviate the problem outlined and generally to make available a reliably and effectively working apparatus for cutting and stirring curd, which enables the production of a qualitatively superior-grade cheese.

BRIEF SUMMARY OF THE INVENTION

According to the invention, an apparatus for cutting and stirring curd, comprising a curd vat with a shaft drivable for rotation, which shaft comprises a number of cutting frames extending radially from the shaft and having a number of strip-shaped transverse knives and longitudinal knives, the longitudinal knives each having an inner end situated near the shaft and an outer end situated near the wall of the curd vat is characterized in that at least a number of longitudinal knives of at least one of the cutting frames are provided, at the outer end situated near the wall of the curd vat, with a knife end section which has at least one portion extending transversely to the longitudinal direction of the longitudinal knives.

BRIEF DESCRIPTION OF THE DRAWINGS

In the following, the invention will be further de scribed with reference to the accompanying drawing.

DETAILED DESCRIPTION OF THE INVENTION

Figure 1:
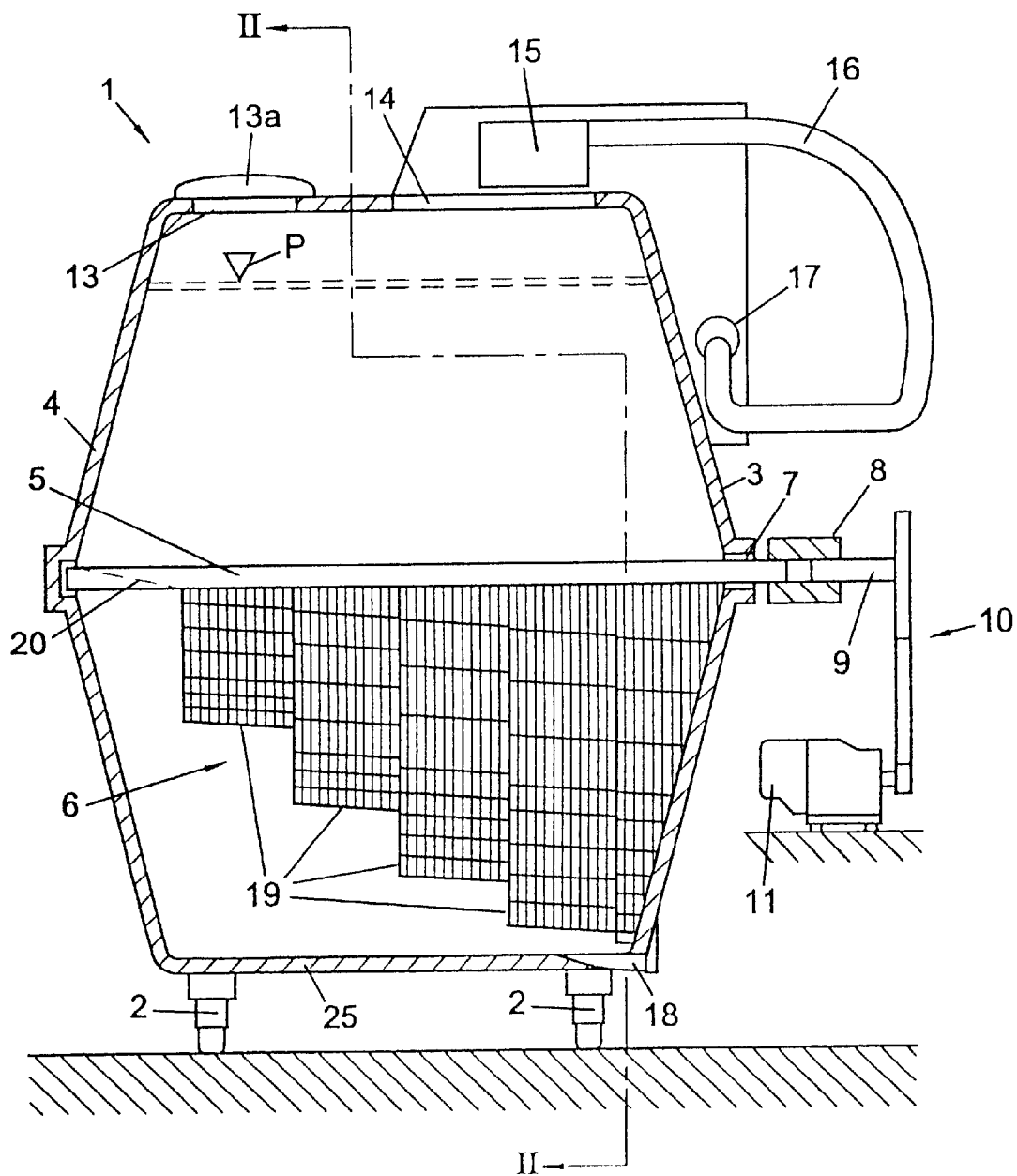
FIG. 1 schematically shows in longitudinal cross section an example of a known apparatus for cutting and stirring curd.
Figure 2:
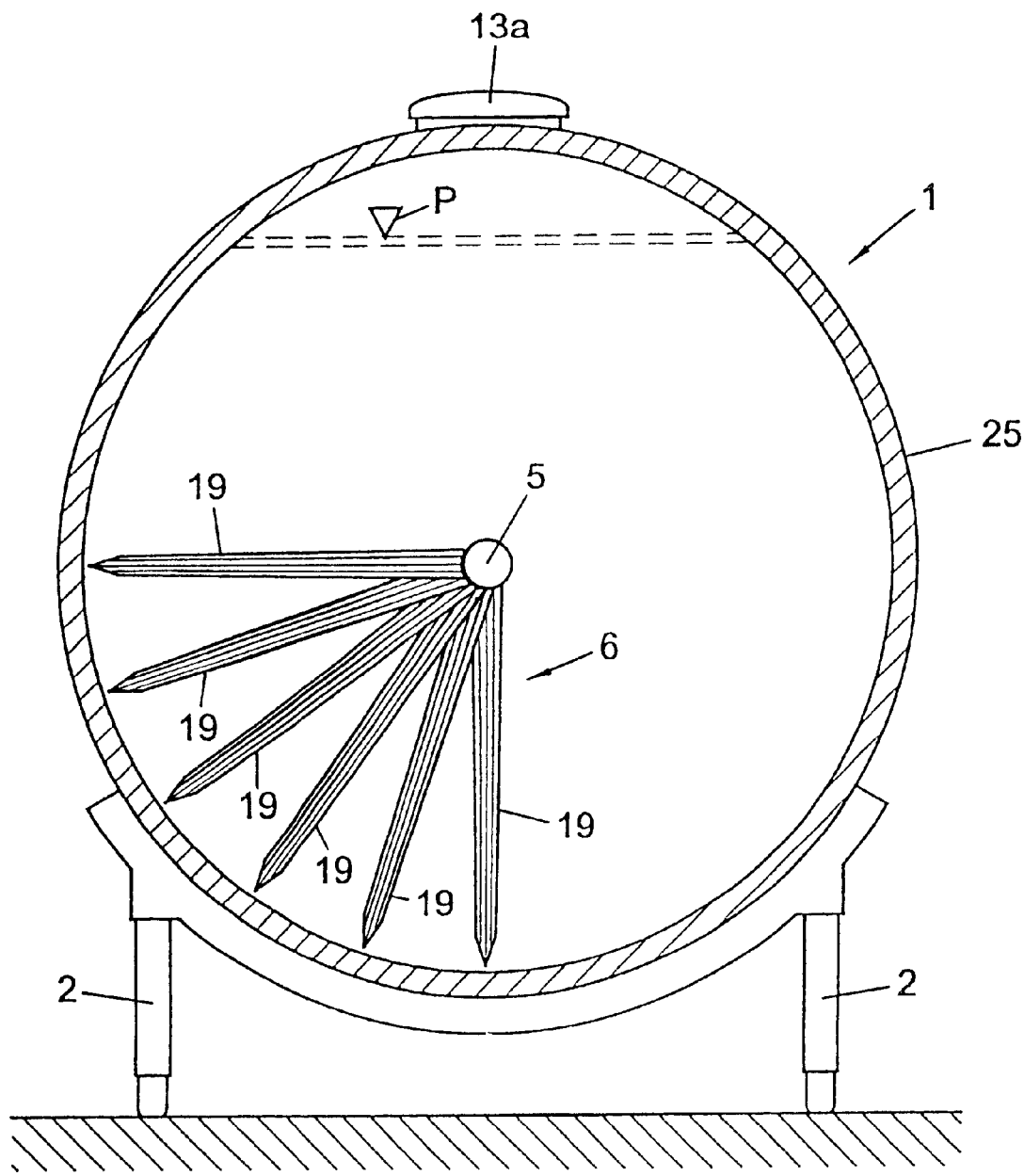
FIG. 2 schematically shows the apparatus of FIG. 1 in cross section along the line II—II in FIG. 1.

FIGS. 1 and 2 represent a known cylindrical horizontally-disposed curd vat 1 which is supported by a number of legs 2. The end walls 3, 4 of the curd vat 1 are conical in this example and through one of these end walls a shaft 5 extends centrally into the curd container. This shaft, which in this example is journaled in the opposite end wall, supports a tool 6 for cutting and stirring curd in the curd container. Numeral 7 designates a sealing element between the shaft 5 and the wall 3, through which the shaft 5 extends into the curd container.

Outside the curd container, the shaft 5 is connected by means of a coupling 8 to a shaft 9, which is connected, in most cases coupled directly via transmission means 10, to a drive motor 11. The motor 11 is arranged for rotating the tool 6 around the centerline of the curd vat 1 alternately in one direction and the other.

In this example, the curd vat 1 in its upper part has a manhole 13 which is covered by a manhole cover 13*a*. In this example, further, another opening is provided in the upper part of the curd container 1, which opening is designated by 14 and is intended for the immersion of a whey sieve 15 in the curd container 1. The whey sieve 15 in this example is supported by a bent pipe 16 which is rotatably connected to the curd container 1 at 17. The curd vat 1 has an outlet 18 at its lowest part. A triangle P indicates a customary level of the curd in the curd vat. It is noted that the invention is also applicable to differently designed curd vats.

The tool 6 comprises a number of cutting frames 19 which are situated side by side along the shaft 5, as appears from FIG. 1. In the illustrated embodiment, the tool consists of six sections. The number of sections depends on the size of the tank. The sections are connected to the shaft, such that they form angles with each other, as can be seen in FIG. 2. In the illustrated embodiment, the sections are placed along the shaft 5 so as to extend outwards from the shaft in staggered relation.

Each of the sections may further be fitted at an angle to the shaft 5, as illustrated in FIG. 1 by a broken line 20 indicating the section which is located farthest to the left and is concealed by the shaft 5.

Figure 3:
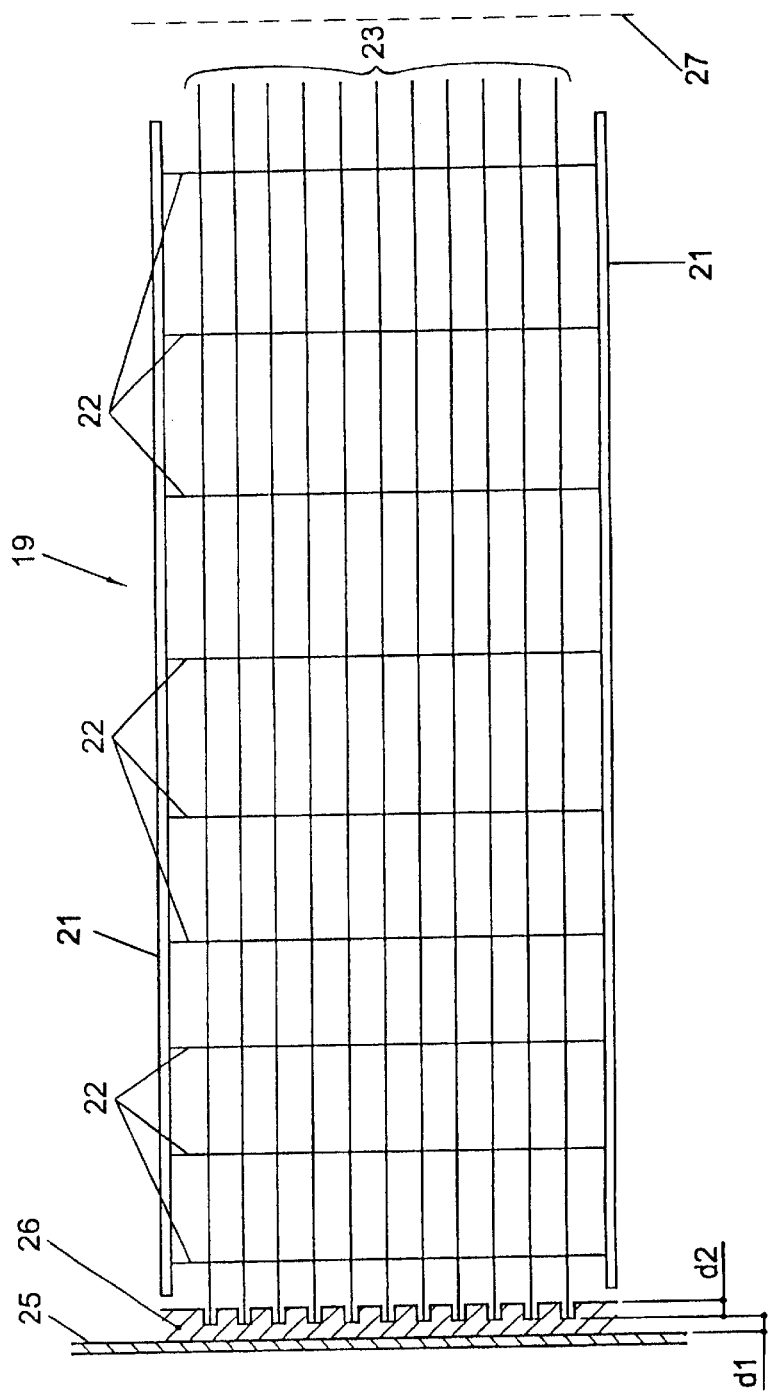
FIG. 3 schematically shows in top plan view an example of a known cutting frame for an apparatus for cutting and stirring curd.
Figure 4:
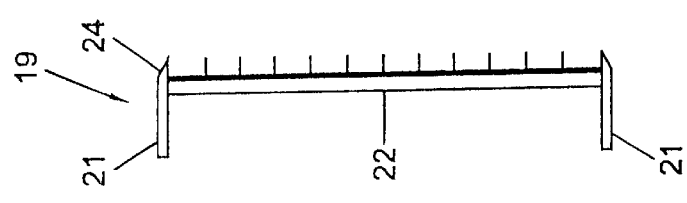
FIG. 4 schematically shows an end view of the cutting frame of FIG. 3.

FIGS. 3 and 4 schematically show in top plan view and end view of an example of a known cutting frame 19, as can be used, for instance, in the apparatus of FIGS. 1 and 2. The known cutting frame comprises two parallel frame girders 21, between which transverse knives 22 extend transversely to the longitudinal girders 21, which transverse knives 22 are welded to the frame girders. In turn extending transversely to the transverse knives 22 and parallel to the frame girders are longitudinal knives 23, which are welded to the transverse knives. The longitudinal girders, the transverse knives and the longitudinal knives are provided, on one longitudinal edge thereof, with a respective cutting edge 24, all situated on the same side with respect to the cutting frame. The other respective longitudinal edge is blunt and typically of rounded design. The sharp edges serve for cutting the curd in one rotational direction of the shaft 5 and the blunt edges serve for stirring the curd in the other rotational direction.

It is noted that in FIG. 3 the longitudinal knives are longer than the frame girders. In reality, however, the frame girders, at least on the side of the rotatable shaft 5, whose centerline is indicated at 27 in FIG. 3, either extend as far as the rotatable shaft or are connected with the rotatable shaft through suitable extension pieces adapted, for instance, to receive the free ends of the frame girders.

At the end of the cutting frame 19 remote from the shaft, the longitudinal knives terminate at a short distance $d_1$ from the shell of the tank 1. A plaque forming on the inside surface of the shell of the tank, if such plaque has a thickness greater than the dimension $d_1$, will therefore be cut by the ends of the knives 23 following parallel cutting lines. In-between the knives, however, the plaque can have a greater thickness than the dimension $d_1$. Eventually, the thickness of the plaque will increase to such an extent that, through the combined action of the terminal end faces of the longitudinal knives and the side surface of the longitudinal knives contiguous to the terminal end faces, the plaque will be pulled off the tank wall. After that, the loosened plaques can be further comminuted by the rotary cutting frames.

An example of such a curd plaque accretion is designated in FIG. 3 by 26. The plaque 26 has an uncut base portion of a thickness $d_1$, and a portion of a thickness $d_2$ which has been cut by the straight ends of the knives 23. In FIG. 3, the lateral distance between the knives and the material of the plaque is represented exaggeratedly. In the plaque, moisture egress proceeds differently than in the remainder of the curd in the tank. This difference is not fully compensated anymore after the plaque has come off the tank wall. Cheeses into which parts of such plaques have been incorporated are less homogeneous than cheeses obtained from curd from a tank in which such plaques do not occur.

According to the invention, the formation of plaques of curd against the wall of a curd vat is prevented, or at least reduced, by providing the ends of the longitudinal knives with special knife ends, which comprise at least one portion extending substantially transversely to the longitudinal knives.

Figure 5:
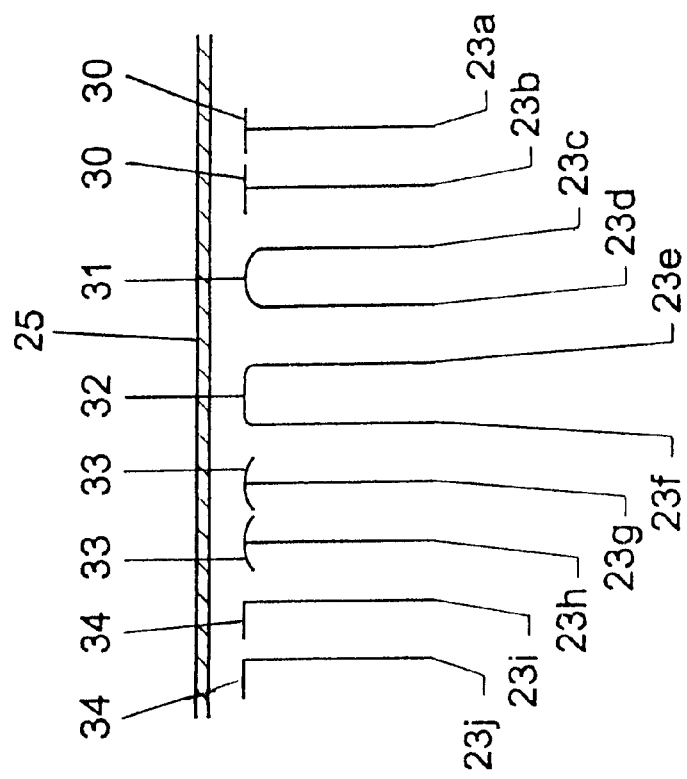
FIG. 5 schematically shows a number of possible exemplary embodiments of the invention.

FIG. 5 shows a part of a tank wall 25, as well as a number of examples of ends of longitudinal knives 23*a* to 23*j* extending transversely to the tank wall and terminating adjacent the tank wall. All ends are provided with special knife end sections having parts extending transversely to the knife direction. The longitudinal knives 23*a* and 23*b* are provided with knife end sections 30 being T-shaped in top plan view, which have been obtained either by attaching a T-shaped part to the end of the longitudinal knives or by simply forming a transverse portion. Attachment can be done, for instance, through welding. By way of alternative (not shown), it is possible to fit a single continuous transverse strip on the ends of a number of longitudinal knives located next to each other.

The knives 23*c* and 23*d* are provided with a shared U-shaped part 31 of a somewhat round shape. The knives 23*e* and 23*f* are provided with a shared U-shaped part 32 of a more angular shape. The knives 23*g* and 23*h* are each provided with an arcuate transverse part 33, whilst the longitudinal knives 23*i* and 23*j* are provided with cross-pieces 34 situated on one side of the longitudinal knives.

Although it is possible, in principle, to employ different knife ends in one and the same cutting frame, normally a single type of knife end will be used in one cutting frame, and probably also in one curd vat. The knife ends can be provided directly during the manufacture of a cutting frame and, depending on the selected type, may then be integrally formed with the longitudinal knives. This applies, for instance, to the knife ends 34 which can be readily obtained by bending over the ends of the respective longitudinal knives. However, the knife ends can also be discrete elements which are suitably attached to the longitudinal knives, for instance through welding. Such discrete elements have as a great advantage that with the aid thereof existing cutting frames can be easily converted.

Figure 6:
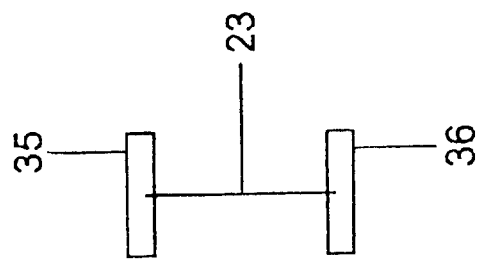
FIG. 6 schematically shows an example of a variant of one of the examples of FIG. 5.

It is noted that after the foregoing, various modifications will readily occur to those skilled in the art. Thus, if desired, the longitudinal knives can also be provided with the above-described knife ends at the inner end thereof, i.e., the end situated proximal to the shaft 5. It is also possible for the end elements to be fitted so as to be slightly staggered upwards or downwards, viewed in the direction of movement of the longitudinal knives, as is shown in FIG. 6. FIG. 6 shows the end face of a longitudinal knife 23 on which a transverse end element 35 has been fitted, displaced slightly upwards. Also indicated in FIG. 6 is that, if desired, a second end element 36 may be used, which is arranged in a downwardly displaced position. These and similar modifications are understood to fall within the framework of the invention.

What is claimed is:

1. A loose knife end section element suitable for use on ends of longitudinal knives of a cutting frame for an apparatus for cutting and stirring curd, said apparatus comprising a curd vat with a shaft drivable for rotation, which shaft comprises a number of cutting frames extending radially from the shaft and having a number of strip-shaped transverse knives and longitudinal knives, the longitudinal knives each having an inner end situated near the shaft and an outer end situated near the wall of the curd vat, characterized in that at least a number of longitudinal knives of at least one of the cutting frames are provided, at the outer end situated near the wall of the curd vat, with said knife end section which has at least one portion extending transversely to the longitudinal direction of the longitudinal knives.

2. An apparatus according to claim 1, characterized in that the knife end section is substantially T-shaped in top plan view.

3. An apparatus according to claim 1, characterized in that the knife end section is substantially U-shaped in top plan view.

4. An apparatus according to claim 1, characterized in that the knife end section is substantially L-shaped in top plan view.

5. An apparatus according to claim 1, characterized in that the knife end section is substantially arcuate in top plan view.

6. An apparatus according to claim 1, characterized in that the loose knife end section is designed for shared mounting on two or more adjacent longitudinal knives, said knife end section having a common portion extending transversely to said two or more longitudinal knives.

7. An apparatus according to claim 1, characterized by a transverse portion which is arranged in an upwardly and/or downwardly placed position with respect to the longitudinal axis of the corresponding longitudinal knife.

\* \* \* \* \*